US011438643B2

(12) United States Patent
Yang

(10) Patent No.: US 11,438,643 B2
(45) Date of Patent: *Sep. 6, 2022

(54) TERMINAL, METHOD FOR VOICE CONTROL, AND RELATED PRODUCTS

(71) Applicant: Guangdong Oppo Mobile Telecommunications Corp., Ltd., Guangdong (CN)

(72) Inventor: Xin Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 309 days.

This patent is subject to a terminal disclaimer.

(21) Appl. No.: 16/538,395

(22) Filed: Aug. 12, 2019

(65) Prior Publication Data
US 2020/0059686 A1    Feb. 20, 2020

(30) Foreign Application Priority Data

Aug. 14, 2018 (CN) .......................... 201810925019.5

(51) Int. Cl.
*H04B 7/00* (2006.01)
*H04N 21/422* (2011.01)
(Continued)

(52) U.S. Cl.
CPC ....... *H04N 21/42203* (2013.01); *G10L 15/26* (2013.01); *G10L 15/28* (2013.01); *H04W 4/80* (2018.02)

(58) Field of Classification Search
CPC ......... G06F 3/167; G10L 15/26; G10L 15/28; H04L 12/281; H04M 1/72412;
(Continued)

(56) References Cited

U.S. PATENT DOCUMENTS 9,836,276 B2    12/2017   Lu
10,158,391 B2 *  12/2018   Altman ............. H04M 1/72412
(Continued)

FOREIGN PATENT DOCUMENTS

CN    1287342 A    3/2001
CN    1826793 A    8/2006
(Continued)

OTHER PUBLICATIONS

Anonymous: "How to Extend the Range of 2.45 GHz Wireless Systems", Jul. 7, 2017 (Jul. 7, 2017), XP055624224, Retrieved from the Internet: URL:https://www.digikey.com/en/articles/techzone/2017/jul/how-to-extend-the-range-of-245-ghz-wireless-systems [retrieved on Sep. 19, 2019].

(Continued)

*Primary Examiner* — Khai N. Nguyen
(74) *Attorney, Agent, or Firm* — Young Basile Hanlon & MacFarlane, P.C.

(57) ABSTRACT

A terminal, a method for voice control, and related products are provided. The method for voice control is applicable to a terminal including a LPWAN communication module, and the method includes the following. A first enhanced LPWAN with at least one smart device is established. Voice data of a user is obtained and a control intention of the user for the at least one smart device is determined according to the voice data. A dedicated control instruction for a first smart device of the at least one smart device is determined according to the control intention, where the dedicated control instruction is used to instruct the first smart device to perform a corresponding operation. The dedicated control instruction is sent to the first smart device.

19 Claims, 7 Drawing Sheets

(51) Int. Cl.
*H04W 4/80* (2018.01)
*G10L 15/28* (2013.01)
*G10L 15/26* (2006.01)

(58) Field of Classification Search
CPC ........ H04M 1/72415; H04N 21/42203; H04W 4/80; Y02D 30/70
USPC .......................................................... 704/275
See application file for complete search history.

(56) References Cited

U.S. PATENT DOCUMENTS

| | | | | |
|---|---|---|---|---|
| 10,334,701 | B1* | 6/2019 | Siminoff | H05B 47/105 |
| 10,412,811 | B1* | 9/2019 | Siminoff | H05B 47/155 |
| 10,443,295 | B2* | 10/2019 | Huggins | E05F 15/76 |
| 10,523,978 | B1* | 12/2019 | Nielsen | H04N 21/2662 |
| 10,615,995 | B2* | 4/2020 | Yu | H04L 12/4625 |
| 10,672,243 | B2* | 6/2020 | Yu | G08B 13/19632 |
| 10,692,492 | B2* | 6/2020 | Rozen | G06F 3/167 |
| 11,044,678 | B2* | 6/2021 | Yang | H04M 1/72412 |
| 2004/0053590 | A1* | 3/2004 | Marholev | H03L 7/0805 455/213 |
| 2007/0066258 | A1* | 3/2007 | Li | H04B 1/30 455/232.1 |
| 2007/0066278 | A1* | 3/2007 | Hong | H04B 1/006 455/405 |
| 2008/0125039 | A1* | 5/2008 | Glinka | H04L 67/04 455/41.2 |
| 2008/0175399 | A1* | 7/2008 | Kim | H04R 3/005 381/57 |
| 2012/0329395 | A1* | 12/2012 | Husted | H04B 1/406 455/41.2 |
| 2013/0148643 | A1* | 6/2013 | Abraham | H04W 84/12 370/338 |
| 2013/0183944 | A1* | 7/2013 | Mozer | H04L 12/282 455/414.1 |
| 2014/0106677 | A1* | 4/2014 | Altman | H04B 1/385 455/41.2 |
| 2016/0080896 | A1 | 3/2016 | Song et al. | |
| 2016/0283191 | A1* | 9/2016 | Lu | G11B 27/105 |
| 2017/0372576 | A1 | 12/2017 | Choe et al. | |
| 2018/0024224 | A1 | 1/2018 | Seller | |
| 2018/0060430 | A1* | 3/2018 | Lu | G10L 15/22 |
| 2018/0245395 | A1* | 8/2018 | Huggins | E05F 15/76 |
| 2018/0295405 | A1* | 10/2018 | Barnett, Jr. | H04N 21/414 |
| 2019/0103100 | A1* | 4/2019 | Rozen | G10L 15/22 |
| 2019/0174599 | A1* | 6/2019 | Senas | H05B 47/19 |
| 2019/0215583 | A1* | 7/2019 | Gharabegian | H05B 47/105 |
| 2019/0245712 | A1* | 8/2019 | Yu | H04L 12/4625 |
| 2019/0294136 | A1* | 9/2019 | Iacobone | G05B 19/0428 |
| 2019/0304271 | A1* | 10/2019 | Yu | G08B 13/1963 |
| 2020/0053662 | A1* | 2/2020 | Yang | H04W 4/12 |
| 2020/0059686 | A1* | 2/2020 | Yang | G06F 3/167 |

FOREIGN PATENT DOCUMENTS

| | | |
|---|---|---|
| CN | 1890884 A | 1/2007 |
| CN | 201066845 Y | 5/2008 |
| CN | 201504255 U | 6/2010 |
| CN | 102111314 A | 6/2011 |
| CN | 201947260 U | 8/2011 |
| CN | 103139673 A | 6/2013 |
| CN | 103684533 A | 3/2014 |
| CN | 103826205 A | 5/2014 |
| CN | 104507040 A | 4/2015 |
| CN | 204697118 U | 10/2015 |
| CN | 105099492 A | 11/2015 |
| CN | 105657656 A | 6/2016 |
| CN | 106160757 A | 11/2016 |
| CN | 205721136 U | 11/2016 |
| CN | 106330285 A | 1/2017 |
| CN | 106507329 A | 3/2017 |
| CN | 106712809 A | 5/2017 |
| CN | 106788569 A | 5/2017 |
| CN | 106878468 A | 6/2017 |
| CN | 107222233 A | 9/2017 |
| CN | 107396211 A | 11/2017 |
| CN | 206657863 U | 11/2017 |
| CN | 107426069 A | 12/2017 |
| CN | 107591152 A | 1/2018 |
| CN | 107770759 A | 3/2018 |
| CN | 107864504 A | 3/2018 |
| CN | 108064442 A | 5/2018 |
| CN | 108848570 A | 11/2018 |
| CN | 109121126 A | 1/2019 |
| CN | 109151210 A | 1/2019 |
| CN | 109922543 A | 6/2019 |
| EP | 2842373 A1 | 3/2015 |
| EP | 3279750 A1 | 2/2018 |
| KR | 100726622 B1 | 6/2007 |
| WO | 2013148643 A1 | 10/2013 |
| WO | 2018088953 A1 | 5/2018 |
| WO | 2019105557 A1 | 6/2019 |

OTHER PUBLICATIONS

Partial European Search Report issued in corresponding European Application No. 19191511.5 dated Oct. 22, 2019.
International search report issued in corresponding international application No. PCT/CN2019/100087 dated Nov. 18, 2019.
Extended European search report issued in corresponding European application No. 19191511.5 dated Feb. 10, 2020.
English translation of the First office action issued in corresponding CN application No. 201810925019.5 dated Apr. 28, 2020.
Zou et al, Application of Single-Chip Radio Frequency Transceiver GJRF400, dated May 31, 2001. (5 pages).
Hu Yansong, Communication between Computers Based on Bluetooth Technology, dated Nov. 30, 2017. (4 pages).
Chinese Notification to Grant Patent Right for Invention with English Translation for CN Application 201810925019.5 dated Apr. 12, 2021. (6 pages).
First examination report issued in corresponding IN application No. 201914032688 dated Nov. 26, 2020.
Second office action with English Translation issued in corresponding CN application No. 201810925019.5 dated Oct. 23, 2020.
Partial European search report issued in corresponding European application No. 19191100.7 dated Oct. 1, 2019.
International search report issued in corresponding international application No. PCT/CN2019/100088 dated Oct. 29, 2019.
Extended European search report issued in corresponding European application No. 19191100.7 dated Dec. 13, 2019.
China First Office Action with English Translation issued in corresponding CN application No. 201810909842.7 dated Feb. 3, 2020.
China Second Office Action with English Translation issued in corresponding CN application No. 201810909842.7 dated Sep. 30, 2020.
China Third Office Action with English Translation issued in corresponding CN application No. 201810909842.7 dated Mar. 17, 2021.
Examination Report issued in corresponding European application No. 19191100.7 dated Feb. 3, 2021.
First examination report issued in corresponding IN application No. 201914032410 dated Jan. 20, 2021.

* cited by examiner

TERMINAL, METHOD FOR VOICE CONTROL, AND RELATED PRODUCTS

CROSS-REFERENCE TO RELATED APPLICATIONS

This application claims priority to Chinese Patent Application No. 201810925019.5, filed on Aug. 14, 2018, the disclosure of which is hereby incorporated by reference in its entirety.

TECHNICAL FIELD

This disclosure relates to the technical field of terminals, and more particularly to a terminal, a method for voice control, and related products.

BACKGROUND

At present, terminals on the market are generally provided with a Bluetooth module or a Wireless Fidelity (Wi-Fi) module, which can realize point-to-point data sharing in a network within a short distance. However, a distance for data transmission is limited, and long-distance data sharing is unable to be realized. Smart home products on the market have an intelligent voice control system that can achieve voice control.

SUMMARY

In implementations of the present disclosure, a terminal, a method for voice control, and related products are provided.

In a first aspect of the present disclosure, a terminal is provided. The terminal includes an antenna, a LPWAN communication module coupled with the antenna, and an application processor coupled with the LPWAN communication module.

The LPWAN communication module is operable in a bypass mode and an operation mode. The operation mode is configured for implementing an enhanced signal transmission-reception function in a LPWAN and a signal transmitted by the terminal has an effective transmission distance longer than a preset distance.

In a second aspect of the present disclosure, a method for voice control is provided. The method for voice control is applicable to a terminal. The method includes the following. A first enhanced LPWAN with at least one smart device is established. Voice data of a user is obtained and a control intention of the user for a first smart device of the at least one smart device is determined according to the voice data. A dedicated control instruction for the first smart device is determined according to the control intention, where the dedicated control instruction is used to instruct the first smart device to perform a corresponding operation. The dedicated control instruction is sent to the first smart device.

In a third aspect of the present disclosure, an apparatus for voice control is provided. The apparatus for voice control is applicable to a terminal including a LPWAN communication module. The apparatus includes a processing unit and a communication unit.

The processing unit is configured to: establish a first enhanced LPWAN with at least one smart device through the communication unit; obtain voice data of a user and determining a control intention of the user for a first smart device of the at least one smart device according to the voice data; determine a dedicated control instruction for the first smart device according to the control intention, where the dedicated control instruction is used to instruct the first smart device to perform a corresponding operation; and send the dedicated control instruction to the first smart device.

In a fourth aspect of the present disclosure, a terminal is provided. The terminal includes an application processor, a memory, a communication interface, and one or more programs stored in the memory and configured to be executed by the application processor. The one or more programs include instructions operable to execute all or part of the operations described in the second aspect of the disclosure.

In a fifth aspect of the present disclosure, a non-transitory computer readable storage medium is provided. The computer readable storage medium is configured to store computer programs for electronic data interchange. The computer programs, when executed by a computer, are operable with the computer to execute all or part of the operations described in the second aspect of the disclosure.

In a sixth aspect, a computer program product is provided. The computer program product includes a non-transitory computer-readable storage medium configured to store computer programs. The computer programs are operable with a computer to perform all or part of the operations in the second aspect of the disclosure. The computer program product can be a software installation package.

BRIEF DESCRIPTION OF THE DRAWINGS

To describe technical solutions in implementations of the present disclosure more clearly, the following will briefly introduce the accompanying drawings required for describing the implementations. Apparently, the accompanying drawings in the following description illustrate only some implementations of the present disclosure. Those of ordinary skill in the art may also obtain other drawings based on these accompanying drawings without creative efforts.

DETAILED DESCRIPTION

Figure 1A:
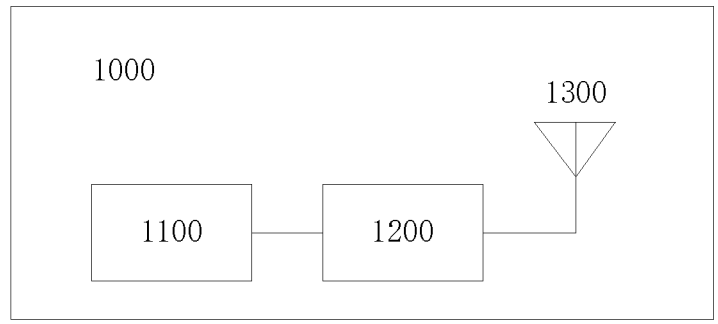
FIG. 1A is a schematic structural diagram illustrating a terminal according to an implementation of the present disclosure.

In order for those skilled in the art to better understand technical solutions of the present disclosure, technical solutions in implementations of the present disclosure will be described clearly and completely hereinafter with reference to the accompanying drawings. Apparently, the described implementations are merely some implementations, rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can be also included either.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that implementations described in the present disclosure may be combined with other implementations.

The terminal involved in implementations of the present disclosure may include various handheld devices, in-vehicle devices, wearable devices, computing devices that have wireless communication functions or other processing devices connected to the wireless modem, as well as various forms of user equipments (UE), mobile stations (MS), terminal devices, and the like.

A LPWAN is a type of wireless telecommunication wide area network designed to allow long-range communications at a low bit rate among things (connected objects). The long range, low power, and low cost rate distinguish this type of network from a wireless WAN that is designed to connect users or businesses, and carry more data, using more power. Ultra Narrowband (UNB) modulation technology used for LPWAN by various companies can include but is not limited to random phase multiple access (RPMA), Qowisio, DART, Sigfox, Telensa, Nwave, Weightless, DART, NB-Fi Protocol. Currently, there are mainly three types of technologies that cater to different needs of LPWAN market, including LoRa (which is a protocol that operates in unlicensed spectrum), NB-IOT technology (which a protocol that operates in licensed spectrum) supported by 3GPP, and Sigfox technology (which is a protocol that operates ultra-narrow-band radios in unlicensed spectrum). Bluetooth is also a type of LPWAN technologies.

Hereinafter, implementations of the disclosure will be described in detail.

FIG. 1A is a schematic structural diagram illustrating a terminal 1000 according to an implementation of the present disclosure. As illustrated in FIG. 1A, the terminal 1000 includes an application processor 1100, a low-power wide-area network (LPWAN) communication module 1200, and an antenna 1300. The application processor 1100 is coupled with the LPWAN communication module 1200. The LPWAN communication module 1200 is coupled with the antenna 1300.

The LPWAN communication module 1200 is operable in an operation mode. When the LPWAN communication module operates in the operation mode, the terminal is configured to implement an enhanced signal transmission-reception function in a LPWAN and a signal transmitted by the terminal has an effective transmission distance longer than a preset distance.

The LPWAN communication module 1200 can also be operable in a bypass mode. When the LPWAN communication module operates in the bypass mode, the terminal is configured to implement a short-haul signal transmission-reception function in the LPWAN and a signal transmitted by the terminal has an effective transmission distance shorter than the preset distance.

The application processor 1100 is a control center of the terminal, which can connect various parts of the entire terminal via various interfaces and lines and can execute various functions of the terminal and processes data by running or executing software programs and/or modules stored in the memory and calling data stored in the memory, thereby monitoring the terminal as a whole. The application processor 1100 mainly deals with operating systems, user interfaces, applications, and the like.

The preset distance may be 500 m (meter), 1 km (kilometer), etc., which is not limited therein. The preset distance can be specified by setting software parameters and/or hardware parameters of the LPWAN communication module.

Bluetooth communication module is a kind of the LPWAN communication module. Bluetooth communication module may include a Bluetooth modem, a receiver, and a transmitter. In terms of the hardware implementation of the Bluetooth modem, the receiver, and the transmitter, the following technologies can be adopted.

(1) The transmitter adopts a polar architecture, thereby improving the efficiency of an external power amplifier and lowering the peak-to-average power ratio (PAPR) requirement. (2) Since the data rate of enhanced data transmission is low, the bandwidth of a modulation signal is lower than the bandwidth of the phase-locked loop circuit module, and one point modulation can be directly adopted on the basis of the polar architecture. (3) The receiver adopts the Low-intermediate frequency (Low-IF) architecture to reduce the impact of flicker noise on sensitivity. (5) An analog-to-digital converter (ADC) of the receiver adopts a Quadrature bandpass sigma-delta ADC (SD-ADC). (6) SD-ADC has adjustable center frequency and bandwidth, and the optimal noise transfer function (NTF) is obtained based on bandwidth of a traditional signal and bandwidth of an enhanced signal to suppress quantization noise. (7) A modem has an adjustable clock, and for enhanced signal transmission, low-speed transmission can be achieved by directly dividing the original frequency of the clock by 8 or 16. (8) Since the data rate of the signal is low and there is large in-band bandwidth available, the BT in the pulse shaping filter (PSF) can be increased to suppress the interference due to the inter symbol interference (ISI) codes.

As can be seen, in the implementations of the present disclosure, the terminal can implement an enhanced data transmission with aid of the LPWAN communication module, thereby increasing an effective distance in which the terminal performs LPWAN communication, which is beneficial to expanding the use of a LPWAN communication function of the terminal, thereby satisfying various requirements of specific scenarios such a scenario without mobile network and expanding functionality and applicability of the terminal.

Figure 1B:
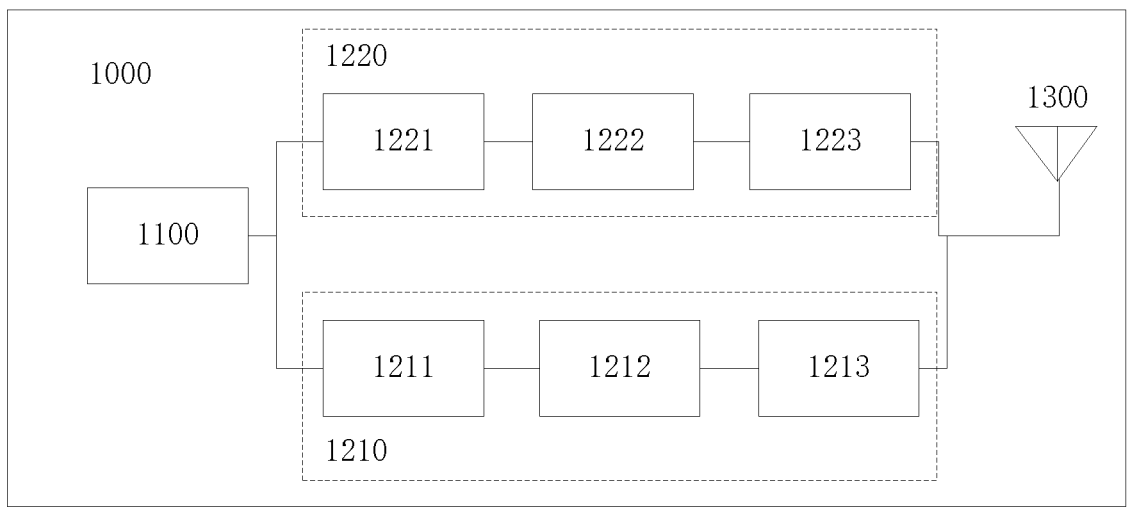
FIG. 1B is a schematic structural diagram illustrating a terminal according to another implementation of the present disclosure.

In an implementation, as illustrated in FIG. 1B, the LPWAN communication module 1200 includes a received-signal processing circuit 1210 and a transmitted-signal processing circuit 1220.

The transmitted-signal processing circuit 1220 includes a modulation circuit module 1221, a transmitter 1222, and an external power amplifier 1223. The received-signal processing circuit 1210 includes a demodulation circuit module 1211, a receiver 1212, and an external low-noise filter 1213.

The application processor 1100 is coupled with the modulation circuit module 1221 and a demodulation circuit module 1211. The modulation circuit module 1221 is coupled with the transmitter 1222. The transmitter 1222 is coupled with the external power amplifier 1223. The external power amplifier 1223 is coupled with the antenna 1300. The demodulation circuit module 1211 is coupled with the receiver 1212. The receiver 1212 is coupled with the external low-noise filter 1213. The external low-noise filter 1213 is coupled with the antenna 1300.

The external power amplifier 1223 is operable in the operation mode, that is, the terminal is configured to transmit a signal via the external power amplifier 1223. The operation mode is configured for implementing an enhanced signal-transmission function in the LPWAN, and the enhanced signal-transmission function has an effective transmission distance longer than the preset distance.

The external low-noise filter 1213 is operable in the operation mode, that is, the terminal is configured to receive a signal via the external low-noise filter 1213. The operation mode is configured for implementing an enhanced signal-reception function in the LPWAN, and the enhanced signal-reception function has an effective transmission distance longer than the preset distance.

The modulation circuit module 1221 and the demodulation circuit module 1211 are generally integrated to be a modem as a separate device disposed in the terminal.

As can be seen, in this implementation, in the terminal, on the basis of an original LPWAN communication module, the external power amplifier is directly provided to the transmitted-signal processing circuit, and the external low-noise filter is directly provided to the received-signal processing circuit, thereby increasing transmitting power and improving receiving sensitivity. The communication module is modified slightly, and an original wireless communication protocol is directly multiplexed. In this way, high efficiency in setting is achieved with low function expansion cost, and the manner in which modes are switched is convenient and efficient.

Figure 1C:
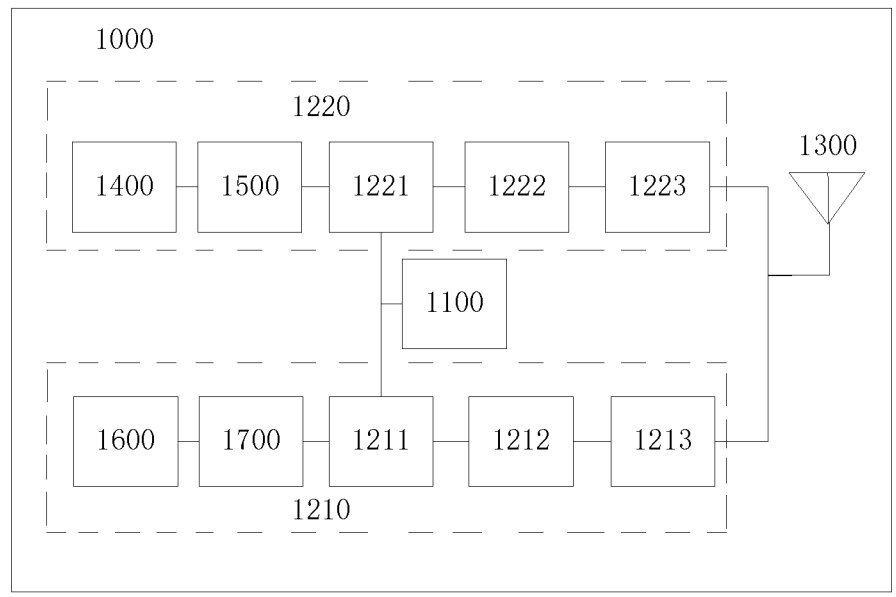
FIG. 1C is a schematic structural diagram illustrating a terminal according to another implementation of the present disclosure.

In an implementation, as illustrated in FIG. 1C, the terminal 1000 further includes a microphone 1400 and an audio encoder 1500. The microphone 1400 is coupled with the audio encoder 1500. The audio encoder 1500 is coupled with the modulation circuit module 1221.

The terminal 1000 further includes an audio decoder 1600 and a speaker 1700. The audio decoder 1600 is coupled with the speaker 1700. The speaker 1700 is coupled with the demodulation circuit module 1211.

As can be seen, in this implementation, since the microphone, the audio encoder, the audio decoder, and the speaker can process voice data, types of data supported by the enhanced data transmission function of the terminal can be extended to voice data, thereby further improving the applicability of the enhanced data transmission function.

Figure 1D:
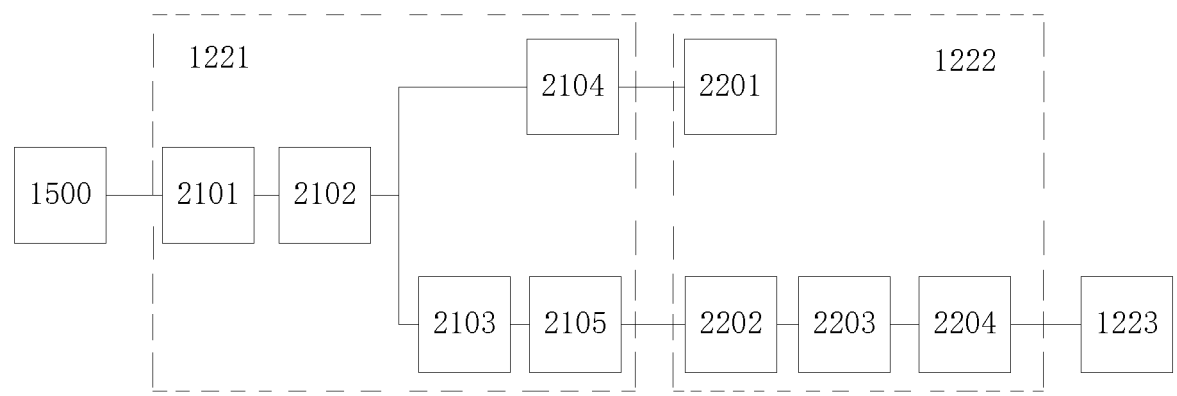
FIG. 1D is a schematic structural diagram illustrating a modulation circuit module and a transmitter according to an implementation of the present disclosure.

In an implementation, as illustrated in FIG. 1D, the modulation circuit module 1221 includes a first digital-signal processing chip 2101, a coordinate rotation digital computer 2102 (such as catesian to polar), a differential circuit module 2103, a first digital-to-analog converter 2104, and a second digital-to-analog converter 2105. The transmitter 1222 includes a first low-pass filter 2201, a second low-pass filter 2202, a phase-locked loop circuit module 2203, and an integrated power amplifier 2204.

The first digital-signal processing chip 2101 is coupled with the coordinate rotation digital computer 2102. The coordinate rotation digital computer 2102 is coupled with the first digital-to-analog converter 2104 and the differential circuit module 2103. The differential circuit module 2103 is coupled with the second digital-to-analog converter 2105. The first digital-to-analog converter 2104 is coupled with the first low-pass filter 2201. The second digital-to-analog converter 2105 is coupled with the second low-pass filter 2202. The second low-pass filter 2202 is coupled with the phase-locked loop circuit module 2203. The phase-locked loop circuit module 2203 is coupled with the integrated power amplifier 2204. The integrated power amplifier 2204 is coupled with the external power amplifier 1223.

As can be seen, in this implementation, the polar architecture is adopted for the transmitter to improve the efficiency of the external power amplifier and lower the PAPR requirement. The clock of a modem is adjustable, and the enhanced signal transmission-reception function can implement a low-speed transmission by directly dividing the original frequency of the lock by 8 or 16.

Figure 1E:
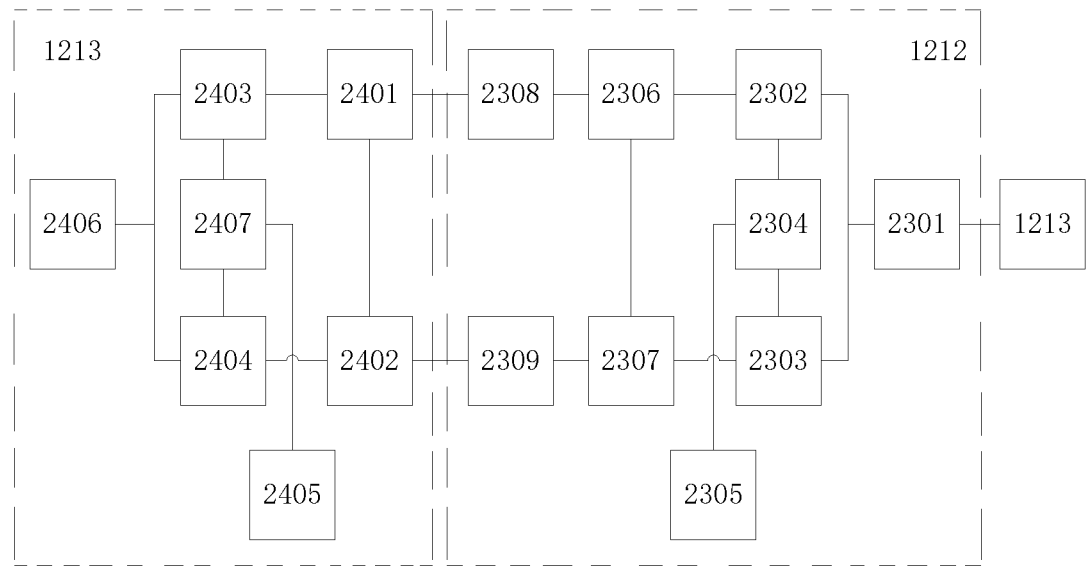
FIG. 1E is a schematic structural diagram illustrating a receiver and a demodulation circuit module according to an implementation of the present disclosure.

In an implementation, as illustrated in FIG. 1E, the receiver 1212 includes an integrated low-noise filter 2301, a first mixer 2302, a second mixer 2303, a first in-phase and quadrature (IQ) phase modulation module 2304, a first local oscillator 2305, a first image-reject filter 2306, a second image-reject filter 2307, a first variable gain amplifier 2308, and a second variable gain amplifier 2309.

The demodulation circuit module 1211 includes a first analog-to-digital converter 2401, a second analog-to-digital converter 2402, a third mixer 2403, a fourth mixer 2404, a second IQ phase modulation module 2405, a second digital-signal processing chip 2406, and a second local oscillator 2407.

The external low-noise filter 1213 is coupled with the integrated low-noise filter 2301. The integrated low-noise filter 2301 is coupled with the first mixer 2302 and the second mixer 2303. The first mixer 2302 and the second mixer 2303 are coupled with the first IQ phase modulation module 2304. The first IQ phase modulation module 2304 is coupled with the first local oscillator 2305. The first mixer 2302 is coupled with the first image-reject filter 2306. The first image-reject filter 2306 is coupled with the first variable gain amplifier 2308. The first variable gain amplifier 2308 is coupled with the first analog-to-digital converter 2401. The first analog-to-digital converter 2401 is coupled with the third mixer 2403. The third mixer 2403 is coupled with the second digital-signal processing chip 2406. The second image-reject filter 2307 is coupled with the second variable gain amplifier 2309. The second variable gain amplifier 2309 is coupled with the second analog-to-digital converter 2402. The second analog-to-digital converter 2402 is coupled with the fourth mixer 2404. The fourth mixer 2404 is coupled with the second digital-signal processing chip 2406. The third mixer 2403 and the fourth mixer 2404 are coupled with the second IQ phase modulation module 2405. The second IQ phase modulation module 2405 is coupled with the second local oscillator 2407.

The first image-reject filter 2306 is coupled with the second image-reject filter 2307, and the first analog-to-digital converter 2401 is coupled with the second analog-to-digital converter 2402.

As can be seen, in this implementation, analog-to-digital converters of the receiver adopt Quadrature bandpass SD-ADC. Since the center frequency and the bandwidth of the SD-ADC are adjustable, the optimal NTF is obtained based on bandwidth of the traditional signal and the enhanced signal to suppress quantization noise. The clock of a modem is adjustable, and the enhanced signal transmission-reception function can implement a low-speed transmission by directly dividing the original frequency of the lock by 8 or 16.

Figure 1F:
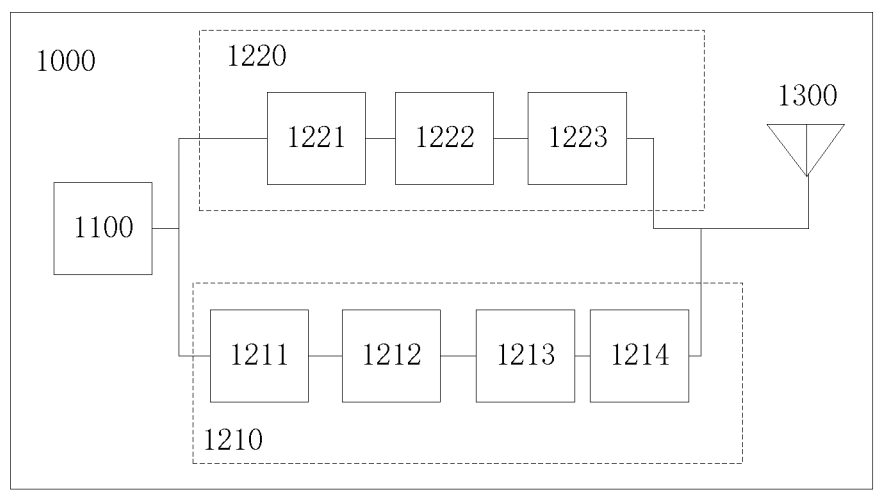
FIG. 1F is a schematic structural diagram illustrating a terminal according to another implementation of the present disclosure.

In an implementation, as illustrated in FIG. 1F, the received-signal processing circuit 1210 further includes a pre-filter 1214, and the pre-filter 1214 is coupled with the antenna 1300 and the external low-noise filter 1213.

As can be seen, in this implementation, the pre-filter 1214 is provided to further filter out clutter, thereby improving reception stability.

Figure 2:
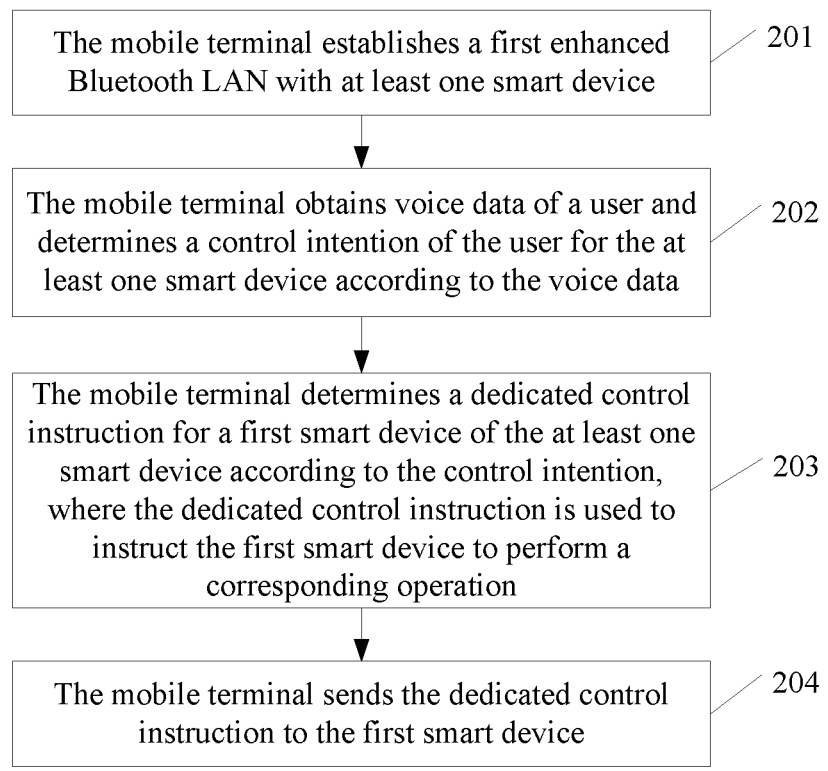
FIG. 2 is a schematic flowchart illustrating a method for voice control according to an implementation of the present disclosure.

FIG. 2 is a schematic flowchart illustrating a method for voice control according to an implementation of the present disclosure. The method for voice control is applicable to the terminal illustrated in FIG. 1A to FIG. 1F. The terminal includes a LPWAN communication module. As illustrated in FIG. 2, the method for voice control begins with operations at block 201.

At block 201, the terminal establishes a first enhanced LPWAN with at least one smart device.

At block 202, the terminal obtains voice data of a user and determines a control intention of the user for the at least one smart device according to the voice data.

At block 203, the terminal determines a dedicated control instruction for a first smart device of the at least one smart device according to the control intention, where the dedicated control instruction is used to instruct the first smart device to perform a corresponding operation.

At block 204, the terminal sends the dedicated control instruction to the first smart device.

As can be seen, in implementations of the present disclosure, the terminal establishes the first enhanced LPWAN with the at least one smart device, obtains the voice data of the user, and then determines the control intention of the user for the first smart device of the at least one smart device according to the voice data. Thereafter the terminal determines the dedicated control instruction for the first smart device according to the control intention, where the dedicated control instruction is used to instruct the first smart device to perform the corresponding operation. The terminal sends the dedicated control instruction to the first smart device. As such, the terminal can realize enhanced data transmission by establishing the enhanced LPWAN, thereby increasing an effective distance and improving transmission capability of the terminal for LPWAN communication, expanding the use of a LPWAN communication function of the terminal, satisfying requirements on data transmission and long-distance intelligent control in home environment, and expanding functionality and applicability of the terminal.

In an implementation, the first enhanced LPWAN with the at least one smart device is established as follows. The first enhanced LPWAN is established. Then network information is broadcast. Feedback information is received from each of the at least one smart device, where the feedback information is indicative that the smart device transmitting the feedback information joins the first enhanced LPWAN.

For example, a smart home product reminds the user of voice input before being used, and voice can be input by recording voice data of at least one user by one or more terminals. After the user clicks a matching button on a control panel of the smart home product, the smart home product executes a matching program, and enables the LPWAN function. At the same time, the control panel will randomly display a matching verification code. When the terminal is paired with the smart home product, the correct matching verification code needs to be input in the terminal, such that the terminal can match the smart home product. As an example, for the terminal matching the smart home product, voice can be input to transmit to the smart home product via LPWAN. The smart home product can perform voiceprint recognition on the input voice. For the terminal matching the smart home product, multiple pieces of voiceprint information can be input. As another example, for the terminal matching the smart home product, voice can be input so that the terminal can perform voiceprint recognition on the input voice. For the terminal on which the voiceprint recognition on the input voice is performed successfully, multiple pieces of voiceprint information can be input. The terminal and the smart home product can store the multiple pieces of voiceprint information as corresponding voiceprint information. Only a device with voiceprint information input has control on the smart home product hereafter.

Both the terminal and the smart home product are devices with an enhanced LPWAN communication function. After the voice is input, the smart home product sets itself as an anchor master (AM), creates a network, and sets a network identity (ID) of the network according to its own media access control (MAC) address. For any one of the terminal and the user equipment, it sets a times synchronization function (TSF) to N times of 512 time units (TU) (N is a positive integer). Generally, a discovery window (DW) is set every 512 TUs.

For a device with the enhanced LPWAN communication function, once the device receives a Beacon frame (that is, a sync beacon, which is called "Beacon frame" hereinafter collectively) sent by one or more devices with the enhanced LPWAN communication function from another network, the device can determine whether to join the other party's network.

Therefore, the terminal with the enhanced LPWAN communication function can send AM information of the network to which it belongs to other smart home products with the enhanced LPWAN communication function by sending a Beacon frame. Similarly, a smart home product with the enhanced LPWAN communication function can receive a Beacon frame sent by the terminal with the enhanced LPWAN communication function from the network or other networks. After receiving the Beacon frame, the smart home product with the enhanced LPWAN communication function can determine whether the Beacon frame is from a terminal with the enhanced LPWAN communication function from the network to which it belongs or a terminal with the enhanced LPWAN communication function from other networks. If the Beacon frame is from a terminal with the enhanced LPWAN communication function from other networks, the smart home product with the enhanced LPWAN communication function can determine whether a network level value corresponding to the received Beacon frame is greater than its own network level value. If YES, the smart home product with the enhanced LPWAN communication function accesses the network corresponding to the received Beacon frame; otherwise, the smart home product with the enhanced LPWAN communication function remains as it is. At the same time, a comparison of Beacon frame levels can also be performed between terminals, so that a terminal can access a network at a higher network level than the network where the terminal is located. In this way, a gather of devices with the enhanced LPWAN communication function is completed, and the device with the enhanced LPWAN communication function will access a network with a higher network level value.

Upon accessing the network of the other party is determined, the smart home product with the enhanced LPWAN communication function synchronizes its AM with an AM of the accessed network after accessing the network of the other party. As an example, the smart home product with the enhanced LPWAN communication function synchronizes various parameter information of the AM with the AM of the accessed network. For example, its original TSF is updated to a TSF of the AM of the accessed network, and the like.

The network created by the terminal has a network ID, which can represent that the network is a permanent network of home domain. In intervals of DWs, a discovery Beacon frame is no longer sent. The network established by each terminal has its own network ID. A smart home device will store the network ID of the network established by the terminal which has the stored voiceprint information, and this network is recorded as a permanent network of home domain. When a user carrying the terminal enters a coverage area of the network, the terminal will first establish an enhanced LPWAN with a home network ID, detect whether other terminals have established permanent networks of home domain, and compare a network level of the enhanced LPWAN with network levels of the permanent networks of home domain established by the other terminals. If there is an enhanced LPWAN whose network level is higher than that of the enhanced LPWAN established by the terminal itself, the terminal accesses the network; otherwise the terminal establishes the first enhanced LPWAN. After establishing the first enhanced LPWAN, the terminal broadcasts the network information containing the network ID and invites a smart home device to access the first enhanced LPWAN. The smart home device judges the network ID. If the network ID has already been stored in the smart home device, the smart home device accepts the invitation and returns corresponding feedback information to access the network.

In this implementation, the smart home product will access (in other words, join) a network with the strongest signal and the broadest coverage area, and information can be exchanged in this network.

In an implementation, after the first enhanced LPWAN is established and before the network information is broadcast, the following can be conducted. A cellular radio frequency module of the terminal is called and a first transmission power of transmitting LPWAN protocol data through the cellular radio frequency module is determined. In another implementation, after the first enhanced LPWAN is established and before the network information is broadcast, the following can be conducted. An enhanced signal transmission-reception path of a LPWAN communication module of the terminal is enabled and a second transmission power of transmitting the LPWAN protocol data through the enhanced signal transmission-reception path of the LPWAN communication module is determined, where both the first transmission power and the second transmission power are equal to or greater than a preset transmission power.

Taking a Bluetooth communication module as an example of the LPWAN communication module, the preset transmission power is a transmission power of an ordinary Bluetooth device on the market. The terminal can be operable in a normal Bluetooth mode. The second transmission power is greater than the first transmission power, and the first transmission power is greater than a power of an ordinary LPWAN communication module. Therefore, it is necessary to determine whether to call the cellular radio frequency module of the terminal or enable the enhanced signal transmission-reception path of the LPWAN communication module of the terminal for data transmission according to a specific situation such as a layout of the smart home device and a coverage area to be covered by the enhanced LPWAN.

Regarding the called cellular radio frequency module of the terminal, the circuit thereof mainly includes an application processor, a cellular network communication module, and a first antenna. The application processor and the cellular network communication module communicate with each other through a global communication interface. The cellular network communication module is coupled with the first antenna. The application processor implements the enhanced signal transmission-reception function in a LPWAN through the cellular network communication module and the first antenna, and the signal transmitted by the terminal has an effective transmission distance longer than a preset distance.

Regarding the enabled enhanced signal transmission-reception path of a LPWAN communication module of the terminal, the circuit thereof mainly includes an application processor, a LPWAN communication module, and a second antenna. The application processor is coupled with the LPWAN communication module, and the LPWAN communication module is coupled with the second antenna. The LPWAN communication module includes a received-signal processing circuit and a transmitted-signal processing circuit. The transmitted-signal processing circuit includes a modulation circuit module, a transmitter, and an external power amplifier. The application processor is coupled with the modulation circuit module and a demodulation circuit module, the modulation circuit module is coupled with the transmitter, the transmitter is coupled with the external power amplifier, and the external power amplifier is coupled with the antenna. The received-signal processing circuit includes a demodulation circuit module, a receiver, and an external low-noise filter. The demodulation circuit module is coupled with the receiver, the receiver is coupled with the external low-noise filter, and the external low-noise filter is coupled with the antenna. The application processor implements the enhanced signal transmission-reception function in a LPWAN through the LPWAN communication module and the second antenna, and the signal transmitted by the terminal has an effective transmission distance longer than a preset distance.

In this implementation, the terminal can flexibly perform power amplification adjustment for different environments and conditions, which is adapted to a situation where the layout of the smart home device in the home environment is variable.

In an example, the voice data of the user is obtained and the control intention of the user for the first smart device of the at least one smart device is determined according to the voice data as follows. The voice data of the user is obtained by a microphone of the terminal. Contents of the voice data of the user are analyzed. The control intention of the user for the first smart device of the at least one smart device is determined according to the contents.

The terminal first performs voice input with the microphone, and performs corresponding noise reduction through a noise reduction function of the terminal to ensure that voice required can still be obtained in a noisy environment, to obtain voice recognition information to be transmitted. Then the identity recognition of voiceprint information is performed. If the voiceprint information is verified successfully, the terminal recognizes the voice information with a smart system, and obtains the control intention in the voice data of the user. Different people may have different authorities, for example, while a parent can turn on a television at any time, a child is only allowed on weekends, and relevant authority settings can be adjusted flexibly.

In this example, the terminal can analyze intelligently the voice data of the user while ensuring voice transmission quality through its own intelligent noise reduction system, so that the control intention of the user can be obtained more accurately.

In an implementation, the dedicated control instruction for the first smart device is determined according to the control intention as follows. According to the control intention, a device identifier of the first smart device is obtained and a function to be performed by the first smart device is determined. The dedicated control instruction for the first smart device is generated according to the device identifier and the function.

After obtaining the control intention, the terminal determines the first smart device to be adjusted by the user, and an instruction contained in the control intention is an instruction to be executed directly, for example, turning on a television, turning off an air conditioner, playing music, and the like. The dedicated control instruction for the first smart device is generated directly according to the control intention. When a DW of the network accessed arrives, the terminal sends service discovery frames (SDF) message through the DW for service discovery, where the SDF message carries the dedicated control instruction. After receiving the SDF message from the terminal, if the smart home product determines that the SDF message is satisfied, the smart home product responds correspondingly.

As can be seen, in this implementation, when the control intention obtained by intelligent analysis of the terminal is the instruction to be executed directly, the control instruction is generated directly and sent to the smart home device, which makes the execution process efficient and convenient.

In an implementation, the first smart device includes a smart television, the control intention for the first smart device includes instructing the smart television to play target video contents, and the dedicated control instruction for the first smart device is determined according to the control intention as follows. A first data transmission channel with the smart television is established according to the control intention. A first channel quality of the first data transmission channel is determined. A second channel quality of a second data transmission channel between the smart television and a video server is obtained. A first dedicated control instruction is generated upon detecting that the first channel quality is better than the second channel quality, where the first dedicated control instruction is for instructing the smart television to obtain the target video contents through the first data transmission channel for playing. A second dedicated control instruction is generated upon detecting that the first channel quality is lower than the second channel quality, where the second dedicated control instruction is for instructing the smart television to obtain the target video contents through the second data transmission channel for playing.

For example, when the user wants to play a certain video program or a certain channel, the terminal obtains the control intention of the user after intelligent voice recognition, and a smart system of the terminal detects that the smart system needs to interact with the smart television to obtain a specific control instruction. First, the terminal establishes the first data transmission channel with the smart television in which the control intention is contained, then a network module of the terminal will obtain data of the certain video program or the certain channel contained in the control intention, and thereafter the terminal sends the data obtained by the network module to the smart television through the first data transmission channel. At the same time, the terminal detects quality of the data of the certain video program or the certain channel after the data is transmitted through the first data transmission channel, which is referred to as the first channel quality. In the meanwhile, the terminal sends the control instruction contained in the control intention to the smart television. After analyzing the control instruction, the smart television establishes the second data transmission channel with the server, and obtains the data of the certain video program or the certain channel contained in the control intention through the second data transmission channel. At the same time, the smart television detects quality of the data of the certain video program or the certain channel after the data is transmitted through the second data transmission channel to obtain the second channel quality, and sends the second channel quality to the terminal. The terminal compares the quality of the first channel with that of the second channel.

If the quality of the first channel is better than the quality of the second channel, the terminal generates the first dedicated control instruction. The first dedicated control instruction includes the following operations to be executed. The terminal obtains the data of the certain video program or the certain channel and sends the data of the certain video program or the certain channel to the smart television through the first data transmission channel, and then the smart television plays video contents.

If the quality of the first channel is inferior to the quality of the second channel, the terminal shall generate the second dedicated control instruction. The second dedicated control instruction includes the following operations to be executed. The smart television obtains the data of the certain video program or the certain channel through the second data transmission channel and plays the corresponding video program or channel.

During playing of a video, the terminal can monitor in real time quality of the channel of the video. If the quality of the channel is low, the terminal detects automatically quality of another channel, compares the quality of another channel with the quality of the channel of the video, and selects a channel of better quality for continuing to play.

It can be seen that in this implementation, the terminal helps the user select a better video playing source through detection and analysis with the smart system, which saves time of the user and improves viewing experience of the user.

In an example, after the dedicated control instruction is sent to the first smart device, the method further includes the following. State information of the first smart device is obtained. The state information is displayed.

After the first smart device receives the dedicated control instruction, the smart device executes the dedicated control instruction and feedbacks an execution result to the terminal through the LPWAN. For example, after the smart television is turned on, the smart television will feedback video contents and channel information currently played to the terminal through a dedicated data transmission channel, and the terminal will display a predetermined interface after the user enters a control page of the smart television, where the predetermined interface includes video contents and channel information.

It can be seen that in this example, the terminal can provide the state information of each smart device, so that the user can understand the current smart device and the home environment, which is beneficial to subsequent operations of the user.

Figure 3:
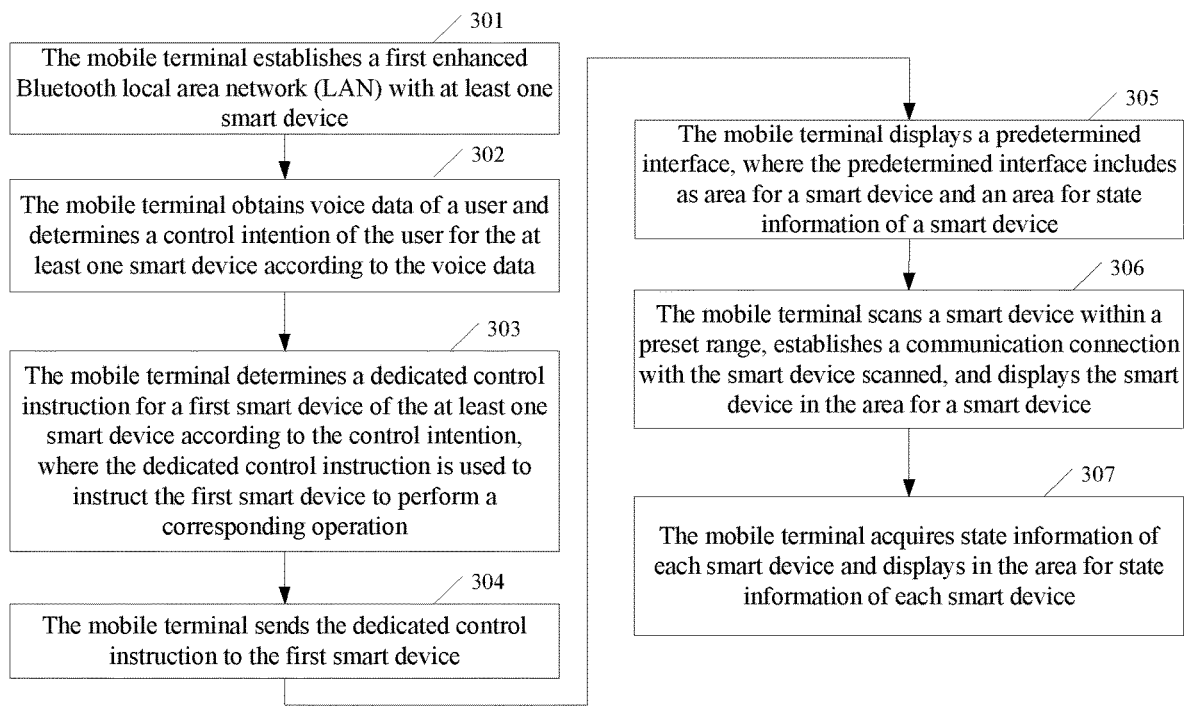
FIG. 3 is a schematic flowchart illustrating a method for voice control according to another implementation of the present disclosure.

Corresponding to the implementations illustrated in FIG. 2, FIG. 3 is a schematic flowchart illustrating a method for voice control according to another implementation of the present disclosure. The method for voice control is applicable to the terminal illustrated in FIG. 1A to FIG. 1F. The terminal includes a LPWAN communication module. As illustrated in FIG. 3, the method for voice control begins with operations at block 301.

At block 301, the terminal establishes a first enhanced LPWAN with at least one smart device.

At block 302, the terminal obtains voice data of a user and determines a control intention of the user for the at least one smart device according to the voice data.

At block 303, the terminal determines a dedicated control instruction for a first smart device of the at least one smart device according to the control intention, where the dedicated control instruction is used to instruct the first smart device to perform a corresponding operation.

At block 304, the terminal sends the dedicated control instruction to the first smart device.

At block 305, the terminal displays a predetermined interface, where the predetermined interface includes an area for a smart device and an area for state information of a smart device.

At block 306, the mobile terminal scans a smart device within a preset range, establishes a communication connection with the smart device scanned, and displays the smart device in the area for a smart device.

At block 307, the terminal obtains state information of each smart device and displays in the area for state information of each smart device.

As can be seen, in implementations of the present disclosure, the terminal establishes the first enhanced LPWAN with the at least one smart device, obtains the voice data of the user, and then determines the control intention of the user for the first smart device of the at least one smart device according to the voice data. Thereafter the terminal determines the dedicated control instruction for the first smart device according to the control intention, where the dedicated control instruction is used to instruct the first smart device to perform the corresponding operation. The terminal sends the dedicated control instruction to the first smart device. As such, the terminal can realize enhanced data transmission by establishing the enhanced LPWAN, thereby increasing an effective distance and improving transmission capability of the terminal for LPWAN communication, expanding the use of a LPWAN communication function of the terminal, satisfying requirements on data transmission and long-distance intelligent control in home environment, and expanding functionality and applicability of the terminal.

In addition, in this implementation, the terminal can provide the state information of each smart device, so that the user can understand the current smart device and the home environment, and the user can query as required on an interactive interface, which is beneficial to subsequent operations of the user, thereby improving control efficiency.

Figure 4:
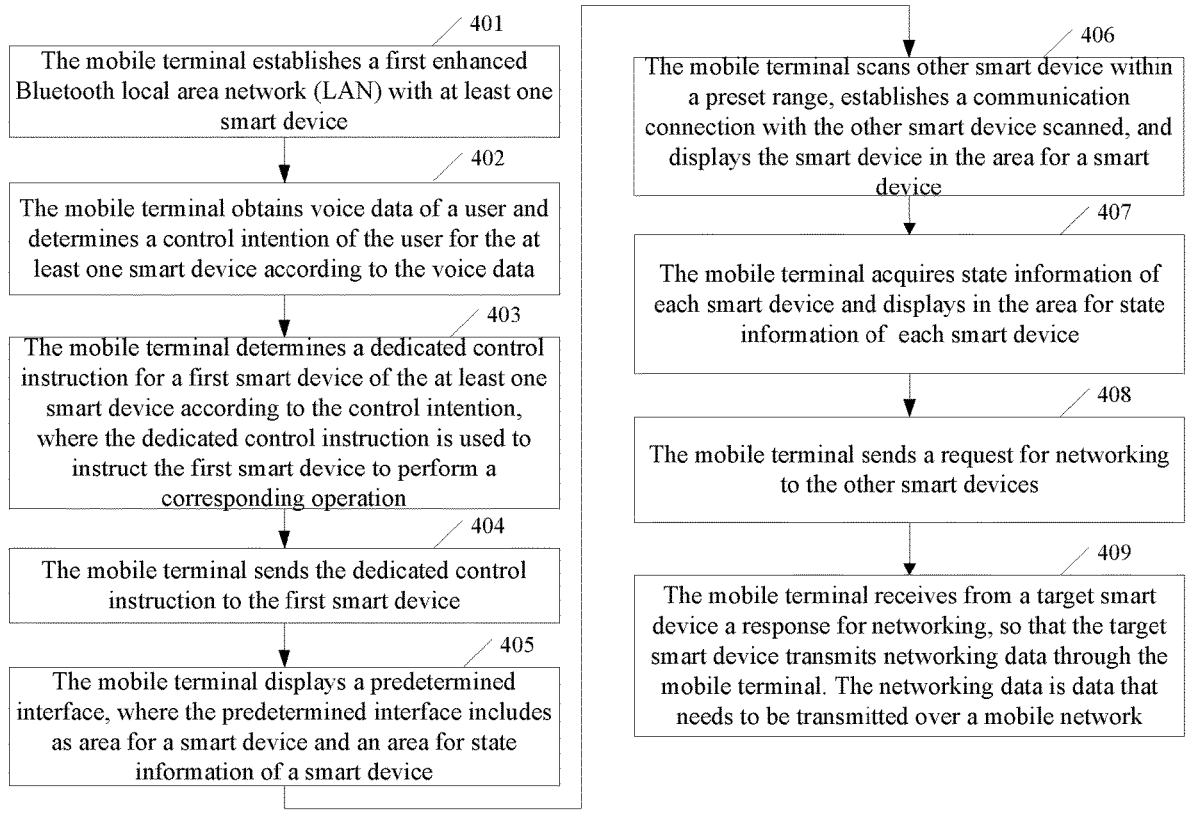
FIG. 4 is a schematic flowchart illustrating a method for voice control according to another implementation of the present disclosure.

Corresponding to the implementations illustrated in FIG. 2, FIG. 4 is a flowchart illustrating a method for voice control according to another implementation of the present disclosure. The method for voice control is applicable to the terminal illustrated in FIG. 1A to FIG. 1F. The terminal includes a LPWAN communication module. As illustrated in FIG. 4, the method for voice control begins with operations at block 401.

At block 401, the terminal establishes a first enhanced LPWAN with at least one smart device.

At block 402, the terminal obtains voice data of a user and determines a control intention of the user for the at least one smart device according to the voice data.

At block 403, the terminal determines a dedicated control instruction for a first smart device of the at least one smart device according to the control intention, where the dedicated control instruction is used to instruct the first smart device to perform a corresponding operation.

At block 404, the terminal sends the dedicated control instruction to the first smart device.

At block 405, the terminal displays a predetermined interface, where the predetermined interface includes as area for a smart device and an area for state information of a smart device.

At block 406, the mobile terminal scans other smart devices within a preset range, establishes communication connections with the other smart devices scanned, and displays the smart devices in the area for a smart device.

At block 407, the terminal obtains state information of each smart device and displays in the area for state information of a smart device.

At block 408, the terminal sends a request for networking to the other smart devices.

At block 409, the terminal receives from a target smart device a response for networking, so that the target smart device transmits networking data through the terminal. The networking data is data that needs to be transmitted over a mobile network.

As can be seen, in implementations of the present disclosure, the terminal establishes the first enhanced LPWAN with the at least one smart device, obtains the voice data of the user, and then determines the control intention of the user for the first smart device of the at least one smart device according to the voice data. Thereafter the terminal determines the dedicated control instruction for the first smart device according to the control intention, where the dedicated control instruction is used to instruct the first smart device to perform the corresponding operation. The terminal sends the dedicated control instruction to the first smart device. As such, the terminal can realize enhanced data transmission by establishing the enhanced LPWAN, thereby increasing an effective distance and improving transmission capability of the terminal for LPWAN communication, expanding the use of a LPWAN communication function of the terminal, satisfying requirements on data transmission and long-distance intelligent control in home environment, and expanding functionality and applicability of the terminal.

In addition, in this implementation, the terminal can provide the state information of each smart device, so that the user can understand the current smart device and the home environment, and the user can query as required on an interactive interface, which is beneficial to subsequent operations of the user, thereby improving control efficiency.

Furthermore, the smart device can transit the data that needs to be sent through the mobile network by terminal in the LPWAN to communicate with the outside, thereby improving the communication capability of the smart device.

Figure 5:
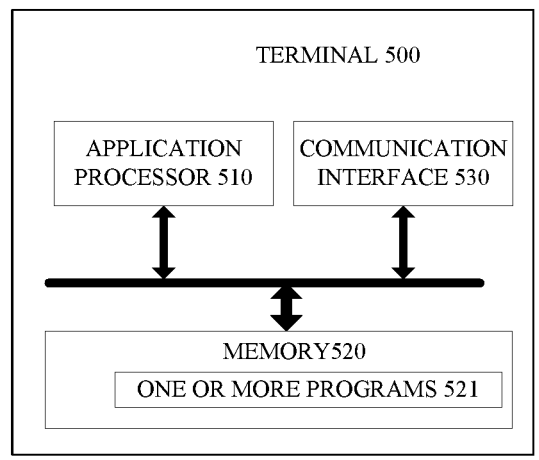
FIG. 5 is a schematic structural diagram illustrating a terminal according to an implementation of the present disclosure.

Corresponding to the implementations illustrated in FIG. 2A, FIG. 3, and FIG. 4, FIG. 5 is a schematic structural diagram illustrating a terminal 500 according to an implementation of the present disclosure. As illustrated in FIG. 5, the terminal 500 includes a processor 510, a memory 520, a communication interface 530, and one or more programs 521. The one or more programs 521 are stored in the memory 520 and are configured to be executed by the processor 510. The one or more programs 521 include instructions operable with the processor to execute all or part of the operations described in the method implementations of the disclosure.

The communication interface 530 can be a LPWAN communication module.

As can be seen, in implementations of the present disclosure, the terminal establishes the first enhanced LPWAN with the at least one smart device, obtains the voice data of the user, and then determines the control intention of the user for the at least one smart device according to the voice data. Thereafter the terminal determines the dedicated control instruction for a first smart device of the at least one smart device according to the control intention, where the dedicated control instruction is used to instruct the first smart device to perform the corresponding operation. The terminal sends the dedicated control instruction to the first smart device. As such, the terminal can realize enhanced data transmission by establishing the enhanced LPWAN, thereby increasing an effective distance and improving transmission capability of the terminal for LPWAN communication, expanding the use of a LPWAN communication function of the terminal, satisfying requirements on data transmission and long-distance intelligent control in home environment, and expanding functionality and applicability of the terminal.

In an example, the one or more programs 521 further include instructions operable with the processor to: send a request for networking to other smart devices; receive a response for networking from a target smart device, so that the target smart device transmits networking data through the terminal. The networking data is data that needs to be transmitted over a mobile network.

The foregoing solution of the implementations of the disclosure is mainly described from the viewpoint of execution process of the method. It can be understood that, in order to implement the above functions, the terminal includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 6:
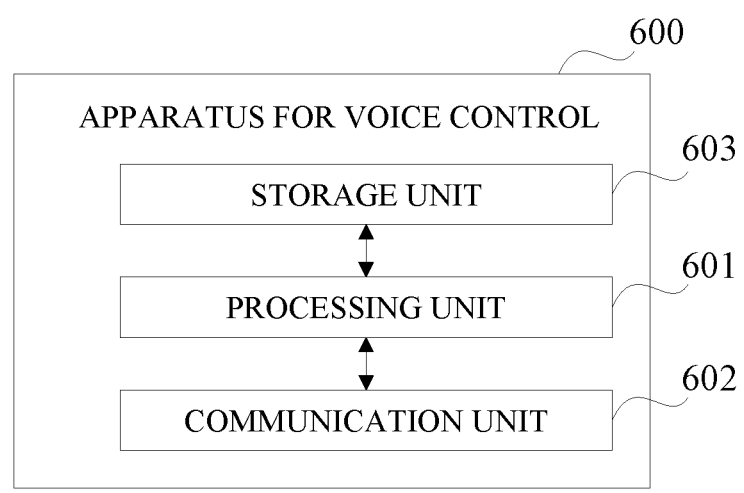
FIG. 6 is a schematic structural diagram illustrating an apparatus for voice control according to an implementation of the present disclosure.

FIG. 6 is a schematic structural diagram illustrating an apparatus 600 for voice control according to an implementation of the present disclosure. The apparatus 600 for voice control is applicable to the terminal illustrated in FIG. 1A to FIG. 1F. The terminal includes a LPWAN communication module. The apparatus 600 for voice control includes a processing unit 601 and a communication unit 602.

The processing unit 601 is configured to execute all or part of the operations described in the method implementations of the disclosure.

The apparatus 600 for voice control may further include a storage unit 603. The storage unit 603 is configured to store program codes and data of the terminal. The processing unit 601 may be an application processor, the communication unit 602 may be a global communication bus, a transceiver, etc., and the storage unit 603 may be a memory.

As can be seen, in implementations of the present disclosure, the terminal establishes the first enhanced LPWAN with the at least one smart device, obtains the voice data of the user, and then determines the control intention of the user of the at least one smart device according to the voice data. Thereafter the terminal determines the dedicated control instruction for a first smart device of the at least one smart device according to the control intention, where the dedicated control instruction is used to instruct the first smart device to perform the corresponding operation. The terminal sends the dedicated control instruction to the first smart device. As such, the terminal can realize enhanced data transmission by establishing the enhanced LPWAN, thereby increasing an effective distance and improving transmission capability of the terminal for LPWAN communication, expanding the use of a LPWAN communication function of the terminal, satisfying requirements on data transmission and long-distance intelligent control in home environment, and expanding functionality and applicability of the terminal.

In an example, in terms of determining the dedicated control instruction for the first smart device according to the control intention, the processing unit 601 is configured to: recognize voice information of the user, obtain a control intention according to the voice information, and generate the dedicated control instruction; send the dedicated control instruction to the first smart device through the communication unit 602.

In an example, in terms of determining the dedicated control instruction for the first smart device according to the control intention, the processing unit 601 is configured to: recognize voice information of the user, interacts with the first smart device according to the voice information through the communication unit 602, and obtain the dedicated control instruction according to an interaction result; send the dedicated control instruction to the first smart device through the communication unit 602.

In an example, the processing unit 601 is further configured to perform the following operations after sending the dedicated control instruction to the first smart device. State information of the first smart device is obtained. The state information is displayed. The processing unit 601 is further configured to display a predetermined interface, where the predetermined interface includes as area for a smart device and an area for state information of a smart device; scan other smart devices within a preset range, establish communication connections with the other smart devices scanned, and display the smart devices in the area for a smart device; obtain state information of each smart device and display in the area for state information of a smart device.

Implementations of the present disclosure also provide a computer readable storage medium. The computer readable storage medium stores computer programs for electronic data interchange which, when executed, are operable with a computer to execute all or part of the operations of any of the methods described in the above-described method implementations. The computer may include the terminal.

Implementations of the present disclosure also provide a computer program product. The computer program product includes a non-transitory computer readable storage medium that stores computer programs. The computer programs are operable with a computer to perform all or part of the operations of any of the methods described in the above method implementations. The computer program product may be a software installation package. The computer may include a terminal.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

The implementations of the present disclosure are described in detail above, and the principles and implementations of the present disclosure are described herein by using specific implementations. The description of the above implementations is only for helping to understand the method and the technical solutions of the present disclosure. For those of ordinary skill in the art, there will be changes in specific implementations and applications according to the idea of the present disclosure. In conclusion, the content of the specification should not be understood as limiting the disclosure.

What is claimed is:

1. A terminal, comprising:
an antenna;
a low-power wide-area network (LPWAN) communication module, coupled with the antenna; and
an application processor, coupled with the LPWAN communication module;
the LPWAN communication module being operable in an operation mode;
the terminal being configured to implement an enhanced signal transmission-reception function in a LPWAN and a signal transmitted by the terminal having an effective transmission distance longer than a preset distance, when the LPWAN communication module operates in the operation mode; and
the LPWAN communication module comprises a received-signal processing circuit and a transmitted-signal processing circuit, the received-signal processing circuit comprises an external low-noise filter, the transmitted-signal processing circuit comprises an external power amplifier, the terminal is configured to receive a signal via the external low-noise filter when the external low-noise filter is operable in the operation mode, and the terminal is configured to transmit a signal via the external power amplifier when the external power amplifier is operable in the operation mode.

2. The terminal of claim 1, wherein the received-signal processing circuit comprises a demodulation circuit module, and a receiver, wherein the demodulation circuit module is coupled with the receiver, the receiver is coupled with the external low-noise filter, and the external low-noise filter is coupled with the antenna; and the external low-noise filter is operable in the operation mode, the operation mode is configured for implementing an enhanced signal-reception function in the LPWAN, and the enhanced signal-reception function has an effective transmission distance longer than the preset distance.

3. The terminal of claim 2, wherein the transmitted-signal processing circuit comprises a modulation circuit module, and a transmitter, wherein the application processor is coupled with the modulation circuit module and the demodulation circuit module, the modulation circuit module is coupled with the transmitter, the transmitter is coupled with the external power amplifier, and the external power amplifier is coupled with the antenna; and the external power amplifier is operable in the operation mode, the operation mode is configured for implementing an enhanced signal-transmission function in the LPWAN, and the enhanced signal-transmission function has an effective transmission distance longer than the preset distance.

4. The terminal of claim 3, wherein the terminal further comprises:

an audio encoder, coupled with the modulation circuit module; and a microphone, coupled with the audio encoder.

5. The terminal of claim 2, wherein the terminal further comprises:

an audio decoder, coupled with the demodulation circuit module; and a speaker, coupled with the audio decoder.

6. A method for voice control, applicable to a terminal, wherein the terminal comprises an antenna, a low-power wide-area network (LPWAN) communication module, and an application processor, the application processor is coupled with the LPWAN communication module, the LPWAN communication module is coupled with the antenna, the LPWAN communication module comprises a received-signal processing circuit and a transmitted-signal processing circuit, the received-signal processing circuit comprises an external low-noise filter, the transmitted-signal processing circuit comprises an external power amplifier, the terminal is configured to receive a signal via the external low-noise filter when the external low-noise filter is operable in an operation mode, and the terminal is configured to transmit a signal via the external power amplifier when the external power amplifier is operable in the operation mode, the method comprises:

establishing a first enhanced low-power wide-area network (LPWAN) with at least one smart device;

obtaining voice data of a user and determining a control intention of the user for the at least one smart device according to the voice data;

determining a dedicated control instruction for a first smart device of the at least one smart device according to the control intention, the dedicated control instruction being used to instruct the first smart device to perform a corresponding operation, wherein the at least one smart device comprises the first smart device; and sending the dedicated control instruction to the first smart device.

7. The method of claim 6, wherein obtaining the voice data of the user and determining the control intention of the user for the at least one smart device according to the voice data comprises:

obtaining, by a microphone of the terminal, the voice data of the user;

analyzing contents of the voice data of the user; and determining the control intention of the user for the at least one smart device according to the contents.

8. The method of claim 6, wherein determining the dedicated control instruction for the first smart device of the at least one smart device according to the control intention comprises:

obtaining a device identifier of the first smart device and determining a function to be performed by the first smart device according to the control intention; and generating the dedicated control instruction for the first smart device according to the device identifier and the function.

9. The method of claim 6, wherein the first smart device comprises a smart television, the control intention for the first smart device comprises instructing the smart television to play target video contents, and determining the dedicated control instruction for the first smart device according to the control intention comprises:

establishing a first data transmission channel with the smart television according to the control intention;

determining a first channel quality of the first data transmission channel;

obtaining a second channel quality of a second data transmission channel between the smart television and a video server;

generating a first dedicated control instruction upon detecting that the first channel quality is better than the second channel quality, wherein the first dedicated control instruction is used to instruct the smart television to obtain the target video contents through the first data transmission channel for playing; and generating a second dedicated control instruction upon detecting that the first channel quality is lower than the second channel quality, wherein the second dedicated control instruction is used to instruct the smart television to obtain the target video contents through the second data transmission channel for playing.

10. The method of claim 6, wherein establishing the first enhanced LPWAN with the at least one smart device comprises:

establishing the first enhanced LPWAN;

broadcasting network information; and receiving feedback information from each of the at least one smart device, wherein the feedback information is indicative that the smart device transmitting the feedback information joins the first enhanced LPWAN.

11. The method of claim 10, further comprising one of:

after establishing the first enhanced LPWAN and before broadcasting the network information:

calling a cellular radio frequency module of the terminal and determining a first transmission power of transmitting LPWAN protocol data through the cellular radio frequency module; and enabling an enhanced signal transmission-reception path of a LPWAN communication module of the terminal and determining a second transmission power of transmitting the LPWAN protocol data through the enhanced signal transmission-reception path of the LPWAN communication module; wherein both the first transmission power and the second transmission power are equal to or greater than a preset transmission power.

12. The method of claim 6, further comprising:
after sending the dedicated control instruction to the first smart device:
obtaining state information of the first smart device; and
displaying the obtained state information.

13. A terminal, comprising an antenna, a low-power wide-area network (LPWAN) communication module, an application processor, a memory, a communication interface, and one or more programs stored in the memory and configured to be executed by the application processor, wherein the application processor is coupled with the LPWAN communication module, the LPWAN communication module is coupled with the antenna, the LPWAN communication module comprises a received-signal processing circuit and a transmitted-signal processing circuit, the received-signal processing circuit comprises an external low-noise filter, the transmitted-signal processing circuit comprises an external power amplifier, the terminal is configured to receive a signal via the external low-noise filter when the external low-noise filter is operable in an operation mode, the terminal is configured to transmit a signal via the external power amplifier when the external power amplifier is operable in the operation mode, and the one or more programs comprising instructions operable with the application processor to:
establish a first enhanced low-power wide-area network (LPWAN) with at least one smart device;
obtain voice data of a user and determine a control intention of the user for the at least one smart device according to the voice data;
determine a dedicated control instruction for a first smart device of the at least one smart device according to the control intention, the dedicated control instruction being used to instruct the first smart device to perform a corresponding operation, wherein the at least one smart device comprises the first smart device; and
send the dedicated control instruction to the first smart device.

14. The terminal of claim 13, wherein in terms of obtaining the voice data of the user and determining the control intention of the user for the at least one smart device according to the voice data, the one or more programs comprises instructions operable with the processor to:
obtain the voice data of the user by a microphone of the terminal;
analyze contents of the voice data of the user; and
determine the control intention of the user for the at least one smart device according to the contents.

15. The terminal of claim 13, wherein in terms of determining the dedicated control instruction for the first smart device of the at least one smart device according to the control intention, the one or more programs comprises instructions operable with the processor to:
obtain a device identifier of the first smart device and determine a function to be performed by the first smart device according to the control intention; and
generate the dedicated control instruction for the first smart device according to the device identifier and the function.

16. The terminal of claim 13, wherein the first smart device comprises a smart television, the control intention for the first smart device comprises instructing the smart television to play target video contents, and in terms of determining the dedicated control instruction for the first smart device according to the control intention, the one or more programs comprises instructions operable with the processor to:
establish a first data transmission channel with the smart television according to the control intention;
determine a first channel quality of the first data transmission channel;
obtain a second channel quality of a second data transmission channel between the smart television and a video server;
generate a first dedicated control instruction upon detecting that the first channel quality is better than the second channel quality, wherein the first dedicated control instruction is used to instruct the smart television to obtain the target video contents through the first data transmission channel for playing; and
generate a second dedicated control instruction upon detecting that the first channel quality is lower than the second channel quality, wherein the second dedicated control instruction is used to instruct the smart television to obtain the target video contents through the second data transmission channel for playing.

17. The terminal of claim 13, wherein in terms of establishing the first enhanced LPWAN with the at least one smart device, the one or more programs comprises instructions operable with the processor to:
establish the first enhanced LPWAN;
broadcast network information; and
receive feedback information from each of the at least one smart device, wherein the feedback information is indicative that the smart device transmitting the feedback information joins the first enhanced LPWAN.

18. The terminal of claim 17, wherein the one or more programs further comprises instructions operable with the processor to:
call a cellular radio frequency module of the terminal and determine a first transmission power of transmitting LPWAN protocol data through the cellular radio frequency module; and
enable an enhanced signal transmission-reception path of a LPWAN communication module of the terminal and determine a second transmission power of transmitting the LPWAN protocol data through the enhanced signal transmission-reception path of the LPWAN communication module; wherein both the first transmission power and the second transmission power are equal to or greater than a preset transmission power.

19. The terminal of claim 13, wherein the one or more programs further comprises instructions operable with the processor to:
obtain state information of the first smart device; and
display the obtained state information.

* * * * *